No. 836,287. PATENTED NOV. 20, 1906.
J. B. VAN OOSTERWYCK.
STEAM GENERATOR.
APPLICATION FILED MAR. 21, 1905.
3 SHEETS—SHEET 1.
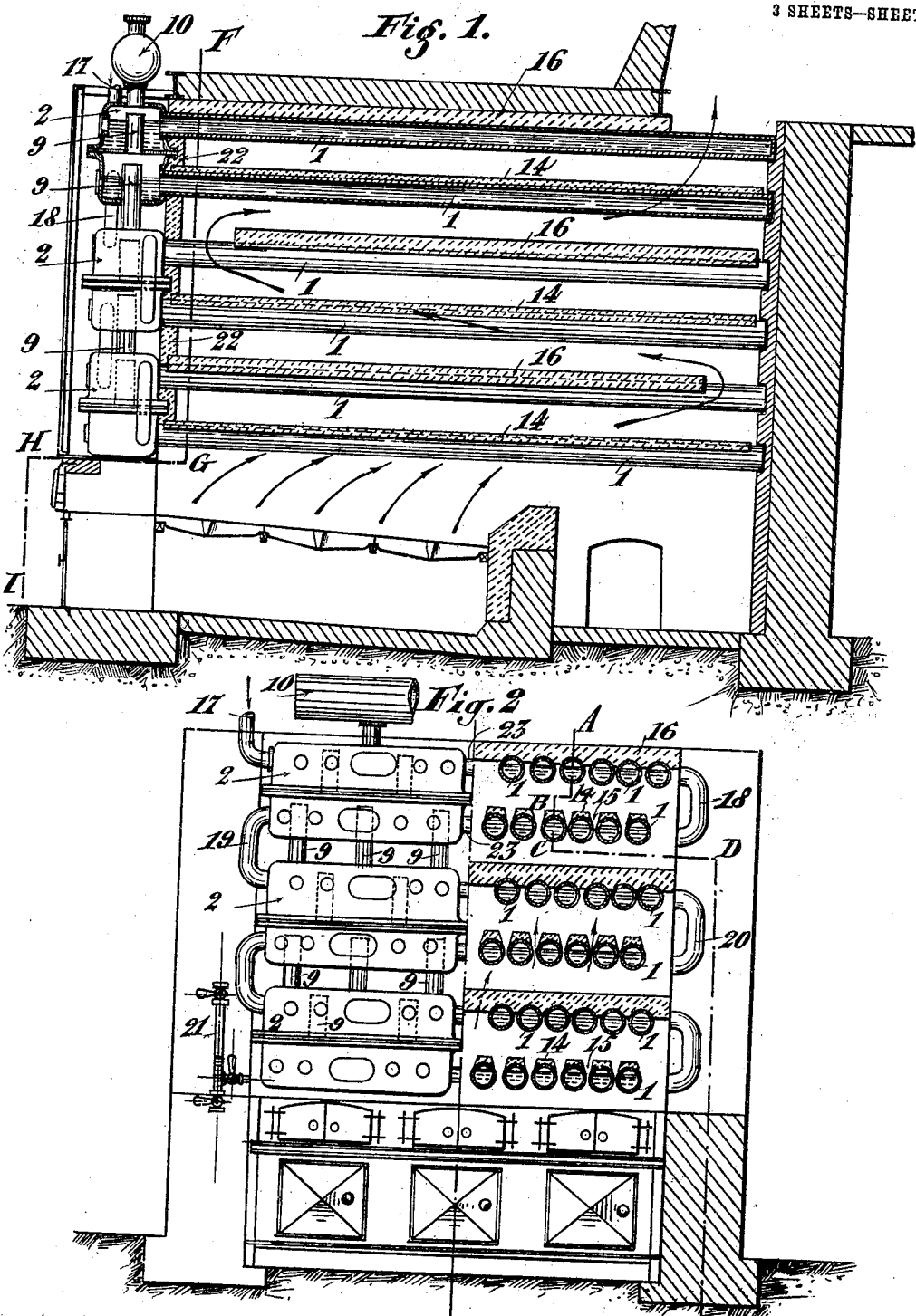

No. 836,287. PATENTED NOV. 20, 1906.
J. B. VAN OOSTERWYCK.
STEAM GENERATOR.
APPLICATION FILED MAR. 21, 1905.

3 SHEETS—SHEET 2.

Witnesses
J. M. Wynkoop
E. G. Barnabaker

Inventor
Jean Baptiste Van Oosterwyck
By Knight Bros. Attys.

THE NORRIS PETERS CO., WASHINGTON, D. C.

No. 836,287. PATENTED NOV. 20, 1906.
J. B. VAN OOSTERWYCK.
STEAM GENERATOR.
APPLICATION FILED MAR. 21, 1905.
3 SHEETS—SHEET 3.
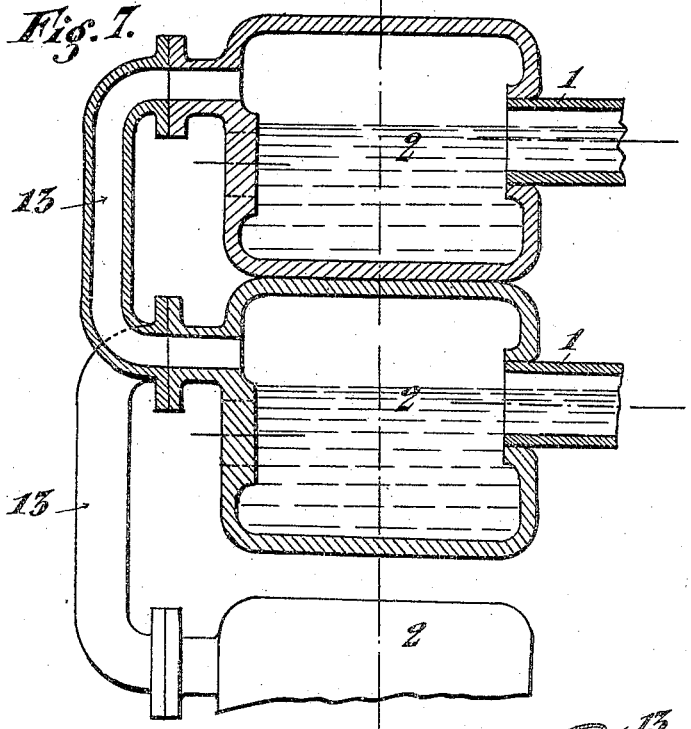
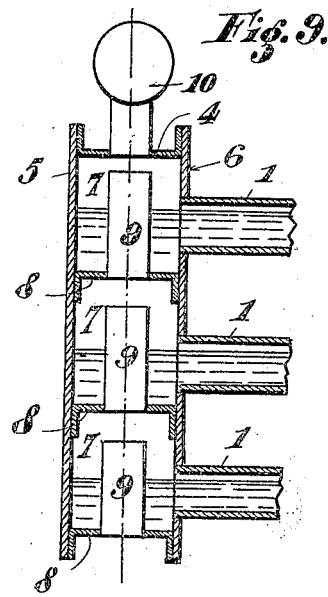
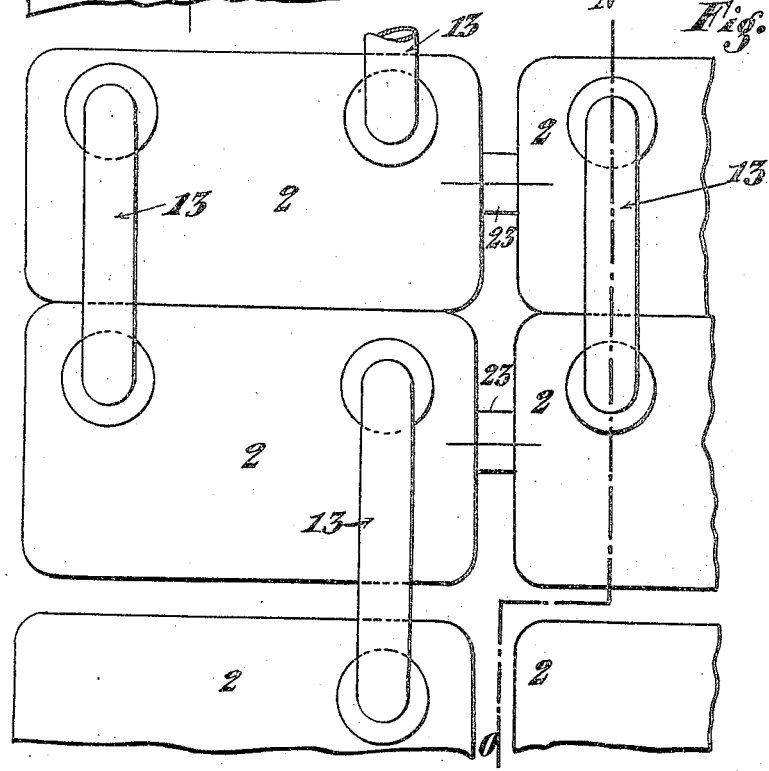
Witnesses
J. M. Hynkoop
E. A. Panabaker
Inventor
Jean Baptiste Van Oosterwyck
By Knight Bros Attys

UNITED STATES PATENT OFFICE.

JEAN BAPTISTE VAN OOSTERWYCK, OF BRUSSELS, BELGIUM.

STEAM-GENERATOR.

No. 836,287.　　　Specification of Letters Patent.　　　Patented Nov. 20, 1906.

Application filed March 21, 1905. Serial No. 251,249.

*To all whom it may concern:*

Be it known that I, JEAN BAPTISTE VAN OOSTERWYCK, engineer, a subject of the King of Belgium, residing in Brussels, Boulevard Anspach, 187, in the Kingdom of Belgium, have invented certain new and useful Improvements in Steam-Generators; and I do hereby declare the following to be a full, clear, and exact description of the invention, such as will enable others skilled in the art to which it appertains to make and use the same, reference being had to the accompanying drawings, and to figures of reference marked therein, which form a part of this specification.

The present invention relates to a new device for producing steam, as fully described and claimed in the present specification.

Figure 3:
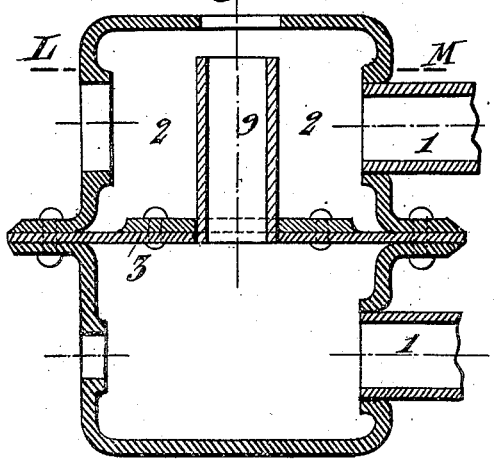
Figure 4:
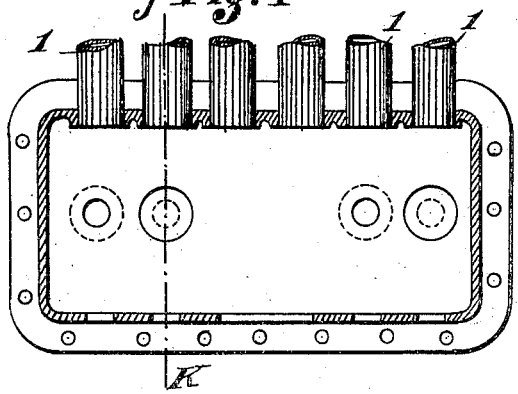
Figure 5:
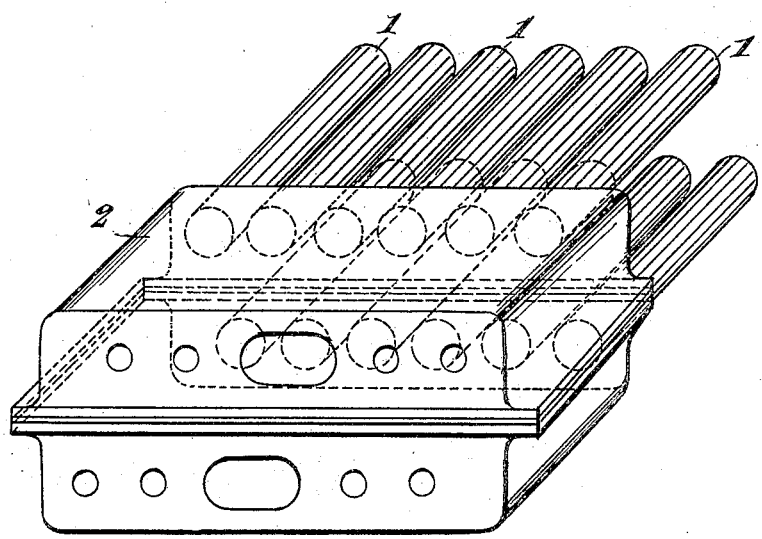
Figure 6:
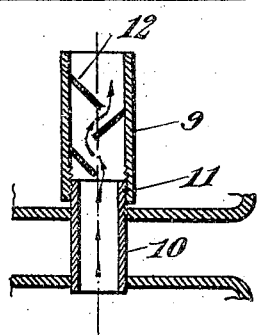

In the accompanying drawings one embodiment of the invention is shown by the way of example. Figure 1 is a longitudinal section on line A B C D E of Fig. 2. Fig. 2 is on the left side a front view and on the right side a transverse section on line F G H I of Fig. 1. Fig. 3 is a transverse section, on an enlarged scale, on line J K of Fig. 4 of what I call a "tube-box." Fig. 4 is a horizontal section on line L M of Fig. 3 of the tube-box. Fig. 5 is a perspective view of the same. Fig. 6 is a transverse cut on line J K of Fig. 4, showing the connection between two tube-boxes and showing also what I call the "steam-chimneys." Fig. 7 is a transverse section on line N O, Fig. 8, of the tube-boxes, showing another device of the steam-chimneys, which in this case are external to the tube-boxes. Fig. 8 is a front view of the same device of tube-boxes. Fig. 9 is a diagrammatical section of the boiler, showing another special device for the tube-boxes.

The steam-generator shown in Figs. 1 to 9 consists of a series of tubes 1 1, which are horizontal or almost horizontal, each of these tubes being closed and free at one end and fitted at its other end in the face of a tube-box 2.

In the device shown in Figs. 1 to 5 each tube-box has a horizontal line of tubes placed in such a manner that the tubes of two consecutive lines are not on the same vertical line, as clearly shown in Fig. 2 (right side) and in Fig. 5. These tube-boxes are connected two per two, as shown in Figs. 1 to 6, and especially in Figs. 3, 4, 5, forming thus double boxes, each of which has two ranges of tubes and is divided in two compartments by a perforated partition 3, each compartment communicating with one range of tubes. However, the boxes may be completely separated one from the other, as shown in Figs. 7 and 8, or all the boxes may be connected together, as diagrammatically shown on Fig. 9. In this case I make a frame 4 built up with U or I iron, closed on its two faces by two iron plates 5 6, thus forming a large box divided in a series of compartments 7, 7 by partitions 8, formed with U or I irons fitted to the frame 4 and to the plates 5 and 6 in a suitable manner. In this case each of the compartments 7 has a range of tubes, these tubes being placed the one over the other in the manner above explained. Of course these boxes could be of any other suitable form, such as cylindrical, for instance.

Considering the front view of the boiler, one horizontal line of tubes corresponds, of course, to one or several boxes, according to the width of the boiler, the different boxes of one horizontal range being connected together with tubes 23, Figs. 2 and 3, in a suitable way.

It is essential to note that the water-tubes 1 1 are not completely filled with water, but that a certain space remains free on the upper part of each tube, so that each of these tubes works as a separate boiler. Thus the tube must be horizontal or have a slight grade in order that this free space remains on the whole length, or at least on the greatest length, of the tube. The parts of the tube which are not internally in contact with the water are of course covered with fire-clay, as shown at 14 and 16 in Figs. 1 and 2. The boxes are also separated from the furnace by a fire-clay wall 22 in such a manner that the tubes alone are in contact with the hot gases.

The steam formed in the tubes is collected in the corresponding tube-boxes. All these boxes are connected together by steam-chimneys 9 (shown in Figs. 1, 2, 3, 6, and 9) and of such a length that the level of water cannot reach their top. These chimneys are fitted in holes bored in the horizontal bottoms or in the partitions of the boxes and placed in such a manner that the steam collected from the tubes in one given box escapes through the chimneys in the upper box, and so on from box to box, and finally passes into the horizontal collector 10, Figs. 1, 2, and 9, which is a single horizontal tube placed at the top of the boiler. Fig. 3 shows how the steam-chimneys 9 are fitted in the partition in case of double or multiple boxes.

Fig. 6 shows the fitting of the chimney 9 between two successive boxes. This device relates to the cases of single boxes, as in Figs. 7 and 8, and of double boxes, as in Figs. 3, 4, and 5. In the case shown in Fig. 6 the two successive boxes are connected together by means of tubes 10, which are secured in their bottoms. These tubes have at their end 11 a thread which receives the end of the chimney 9.

In order to dry the steam, the internal faces of these chimneys have inclined blades 12, which prevent the steam from escaping in a direct way and causes the steam to leave the moisture that it contains. It is interesting to note that the dampest steam is produced in the lowest tubes, where the vaporization is the most intensive. The drying of the steam is such effected in the most rational way, because the dampest steam has to go over the longest way. Therefore the steam collected in the collector 10 may be considered as completely dry, and a comparatively small collector may, therefore, be used.

Instead of collecting the steam by chimneys placed internally to the tube-boxes the steam may be collected by external chimneys 13, as shown in Figs. 7 and 8. Each of the chimneys 13 is connected with the tops of two successive boxes. The steam leaving the lowest box passes through the chimney 13, where its speed is considerably increased. Then it enters in the upper box, where the speed decreases suddenly, the result of this being that the moisture (whose density is higher than that of the steam) leaves the steam and falls on the bottom of the box.

As to the heating of the boiler, the hot gases heat directly the two lower ranges of tubes, as shown in Figs. 1 and 2. The tubes of the first lowest range are simply covered with fire-clay caps 14 with suitable holes or separations 15 in order to allow the passage of the gases. Such caps are put on the top of the third and fifth ranges, &c. The other ranges (second and fourth, &c.) are covered with closed horizontal fire-clay walls 16 only open alternatively at one of their ends in order to compel the gases to go and come back, as generally done in similar types of furnaces. The holes or openings 15 between the fire-clay caps cause the hot gases to be diffused, and these diffused gases being in contact with the hot clay burn integrally, producing a smokeless combustion. This effect of smokelessness is increased by the use of a large grate, this type of boiler being such as to allow this use without any inconvenience.

The feed-water is introduced in the upper tube-box at 17, Figs. 1 and 2. It fills this box to the desired level, (this level being lower than the top of the corresponding steam-chimneys, as shown in Figs. 1 and 9.) Then the water passes through the tube 18, Fig. 2, and fills the second box to the suitable level. Then it passes through the tube 19 in the farther box, &c., until the filling of the lowest box. On this last box is fitted the water-tube 21. This system of feeding has the first advantage that the feeding can be controlled by means of cocks placed on the tubes 18, 19, &c.; but the principal advantage is that this device gives a methodic purification of the feeding water. This water is first introduced in the upper tubes, where the temperature is the lowest. This water passing from these tubes to the following meets increasing temperatures, and at the same time it deposits its impurities and limes so as to be almost pure when it reaches the lowest tubes, the deposits in these tubes (which are directly in contact with the flames) being of but little importance. This is an important feature as to the security.

It is also seen that notwithstanding the small dimensions of the collector 10 the volume of steam is large, for this volume is the totality of the volume of the steam contained in the whole of the collector tubes and boxes. Further, these tubes, working in the same way as boilers, the production of the steam is rapid and intensive, and according to the disposition of the tubes the steam can escape freely out of the tubes.

Having now fully described my invention, what I claim is—

1. A steam-generator comprising a plurality of superposed groups of tubes, means for keeping all of the tubes only partially filled with water, headers connecting the tubes at one end, and pipes arranged outside of the headers and leading from the upper part of each header to the adjacent upper header and terminating at a point above the water-level in said upper header.

2. A steam-generator comprising a plurality of superposed groups of tubes, headers connecting the tubes at one end, and means for keeping all of the tubes only partially filled with water; said means comprising feed-pipes arranged outside of the headers and terminating in the headers on a level with the respective tubes.

In testimony that I claim the foregoing as my invention I have signed my name in presence of two subscribing witnesses.

JEAN BAPTISTE VAN OOSTERWYCK.

Witnesses:
  E. ELREY,
  GREGORY PHELAN.